United States Patent
Davis et al.

(10) Patent No.: US 9,619,466 B2
(45) Date of Patent: *Apr. 11, 2017

(54) MESSAGE TRANSLATIONS

(71) Applicant: Nuance Communications, Inc., Burlington, MA (US)

(72) Inventors: Joel A. Davis, Decatur, GA (US); Larry G. Kent, Jr., Loganville, GA (US); William Todd Daniell, Kennesaw, GA (US); Brian K. Daigle, Marietta, GA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,321

(22) Filed: Jun. 23, 2016

(65) Prior Publication Data
US 2016/0299889 A1 Oct. 13, 2016

Related U.S. Application Data

(63) Continuation of application No. 14/884,103, filed on Oct. 15, 2015, now Pat. No. 9,400,788, which is a continuation of application No. 14/631,540, filed on Feb. 25, 2015, now Pat. No. 9,218,340, which is a continuation of application No. 14/178,914, filed on Feb. 12, 2014, now Pat. No. 9,002,697, which is a continuation of application No. 13/755,903, filed on Jan. 31, 2013, now Pat. No. 8,688,433, which is a
(Continued)

(51) Int. Cl.
*G10L 21/00* (2013.01)
*G06F 17/28* (2006.01)
*G06F 17/27* (2006.01)
*H04L 12/58* (2006.01)

(52) U.S. Cl.
CPC .......... *G06F 17/289* (2013.01); *G06F 17/275* (2013.01); *G06F 17/28* (2013.01); *H04L 12/581* (2013.01); *H04L 51/04* (2013.01); *H04L 51/046* (2013.01)

(58) Field of Classification Search
USPC .................................................. 704/2–9, 277
See application file for complete search history.

(56) References Cited

U.S. PATENT DOCUMENTS

| 5,715,466 A | 2/1998 | Flanagan et al. |
| 5,987,401 A | 11/1999 | Trudeau |
| 6,339,754 B1 | 1/2002 | Flanagan et al. |

(Continued)

FOREIGN PATENT DOCUMENTS

EP 1365553 11/2003

OTHER PUBLICATIONS

Daigle; U.S. Appl. No. 11/320,287, filed Dec. 28, 2005.
(Continued)

*Primary Examiner* — Leonard Saint Cyr

(57) ABSTRACT

Systems for translating text messages in an instant messaging system comprise a translation engine for translating text messages into a preferred language of a recipient of the text messages. The systems are preferably configured to send and receive the text messages and to determine whether the text messages that are received in a source language are in the preferred language of the recipients so that the text messages are displayed in the preferred language of the recipients of the text messages. Other systems and methods are also provided.

20 Claims, 8 Drawing Sheets

Related U.S. Application Data continuation of application No. 10/364,704, filed on Feb. 10, 2003, now Pat. No. 8,392,173.

(56) References Cited

U.S. PATENT DOCUMENTS

| | | |
|---|---|---|
| 6,993,474 B2 | 1/2006 | Curry et al. |
| 7,039,040 B1 | 5/2006 | Burg |
| 7,185,059 B2 | 2/2007 | Daniell et al. |
| 7,925,243 B2 | 4/2011 | Mcgary |
| 2001/0029455 A1 | 10/2001 | Chin et al. |
| 2002/0069062 A1 | 6/2002 | Hyde-Thomson et al. |
| 2002/0169592 A1 | 11/2002 | Aityan |
| 2003/0059022 A1 | 3/2003 | Nebiker et al. |
| 2003/0125927 A1 | 7/2003 | Seme |
| 2003/0163300 A1 | 8/2003 | Kasvand et al. |
| 2004/0102956 A1 | 5/2004 | Levin |
| 2006/0133585 A1 | 6/2006 | Daigle |

OTHER PUBLICATIONS

W3C; Title: Extensible Markup Language (XML (1.0(Second Edition), W3C Recommendation; Oct. 6, 2000; pp. 1-59.

Website: http://www.ceruleanstudios.com/trillian/features-I.html; Cerulean Studios Trillian; printed Apr. 23, 2003; pp. 1-9; Includes Features Tour, messaging Enhancements, interface Overview, Connect to 5 mediums, and 3 individual Feature Tours; 1999-2003.

XMPP Instant Messaging, draft-miller-xmpp-im-00, Jun. 21, 2002, pp. 1-32.

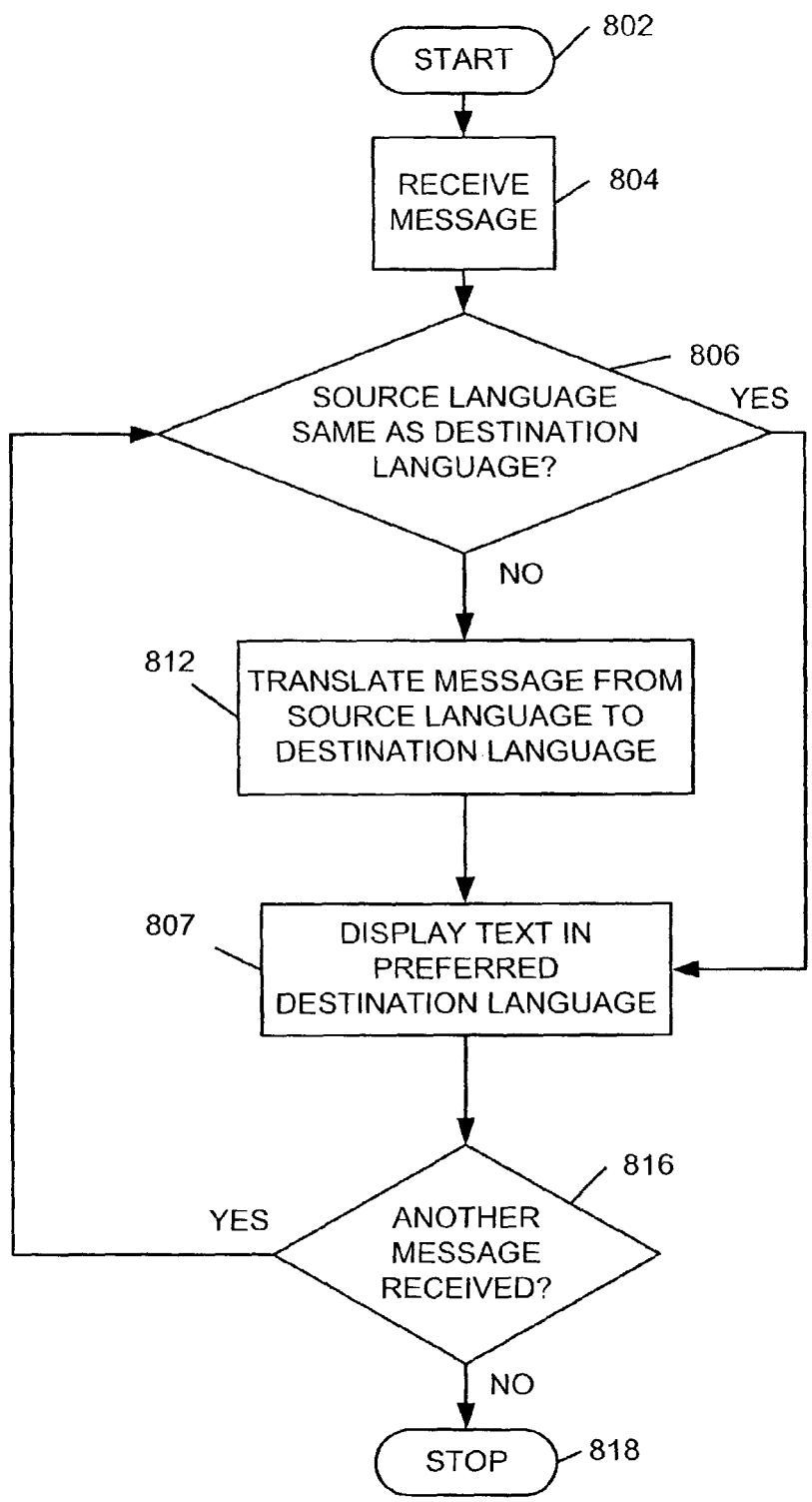

MESSAGE TRANSLATIONS

This application is a continuation of prior application Ser. No. 14/884,103 filed Oct. 15, 2015, which is a continuation of prior application Ser. No. 14/631,540 filed Feb. 25, 2015, and issued as U.S. Pat. No. 9,218,340 on Dec. 22, 2015, which is a continuation of prior application Ser. No. 14/178,914 filed Feb. 12, 2014, and issued as U.S. Pat. No. 9,002,697 on Apr. 7, 2015, which is a continuation of prior application Ser. No. 13/755,903 filed Jan. 31, 2013, and issued as U.S. Pat. No. 8,688,433 on Apr. 1, 2014, which is a continuation of prior application Ser. No. 10/364,704 filed Feb. 10, 2003, and issued as U.S. Pat. No. 8,392,173 on Mar. 5, 2013, the disclosures of which are herein incorporated by reference in their entirety.

TECHNICAL FIELD

The present invention is generally related to communications and, more particularly, is related to real-time and near real-time communications.

BACKGROUND OF THE INVENTION

There exists a growing popularity in instant messaging services. Instant messaging is a real-time based communication method using the World Wide Web and/or the Internet to create a group to which members of the group utilize a computing device to communicate with each other via chat sessions. Chat sessions can take place between two users or groups of users. The chat session may involve members from different cultures who speak different languages. Researchers have estimated that over eighty percent of Internet content and traffic, including Instant Messages (IM) and E-mail is in English, while over forty-five percent of the world population neither speaks nor reads English. Thus, there exists an English-to-non-English language barrier.

In addition, not all non-English speaking people speak the same language. This causes a parallel barrier between each of the major language groups. The existence of these barriers can cause delays in real-time (e.g., Instant Message) or near real-time (e.g., E-mail) communications.

Thus, a heretofore-unaddressed need exists for a solution that addresses the aforementioned deficiencies and inadequacies.

SUMMARY OF THE INVENTION

The preferred embodiments of the present invention provide systems and methods for translating text messages.

Briefly described, in architecture, one preferred embodiment of a system, among others, can be implemented as follows. A system for translating text messages in an instant messaging system comprises a processing device configured as a translation engine for translating text messages into a preferred language of recipients of the text messages. The processing device is further configured to output the text messages for display in a preferred language selected by recipients of the text messages. A display device is coupled to the processing device and configured to display the text messages in the preferred language of the recipients.

The preferred embodiment of the present invention can also be viewed as providing methods for deploying a text message translation system. In this regard, one embodiment of such a method, among others, can be broadly summarized by the following steps; receiving a text message in a source language; determining whether the source language is similar to a preferred destination language; translating the text message into the preferred destination language when the source language is not similar to the preferred destination language; and outputting the text message in the preferred destination language for display.

The preferred embodiment of the present invention can also be viewed as providing methods for establishing language preferences. In this regard, one embodiment of such a method, among others, can be broadly summarized by the following steps; receiving an identification of a preferred language from a user; and saving an indication of the preferred language.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 8 is a flow chart depicting more specific functionality of a preferred embodiment for implementing a text message translation.

DETAILED DESCRIPTION OF THE PREFERRED EMBODIMENTS

Disclosed herein are systems and methods for deploying a text message translations system. To facilitate description of the inventive system, an example system that can be used to implement the systems and methods for deploying a text message translations system is discussed with reference to the figures. Although this system is described in detail, it will be appreciated that this system is provided for purposes of illustration only and that various modifications are feasible without departing from the inventive concept. For example, while several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawing specifically describe translation of instant messaging text, it will be clear to one of ordinary skill in the art that the systems and methods presented herein may be extended to translating other messaging protocols such as voice-over Internet protocol (VoIP), video conferences, electronic mail (E-mail), etc. After the example system has been described, an example of the operation of the system will be provided to explain one manner in which the system can be used to provide for the deployment of a text message translations system.

Figure 1:
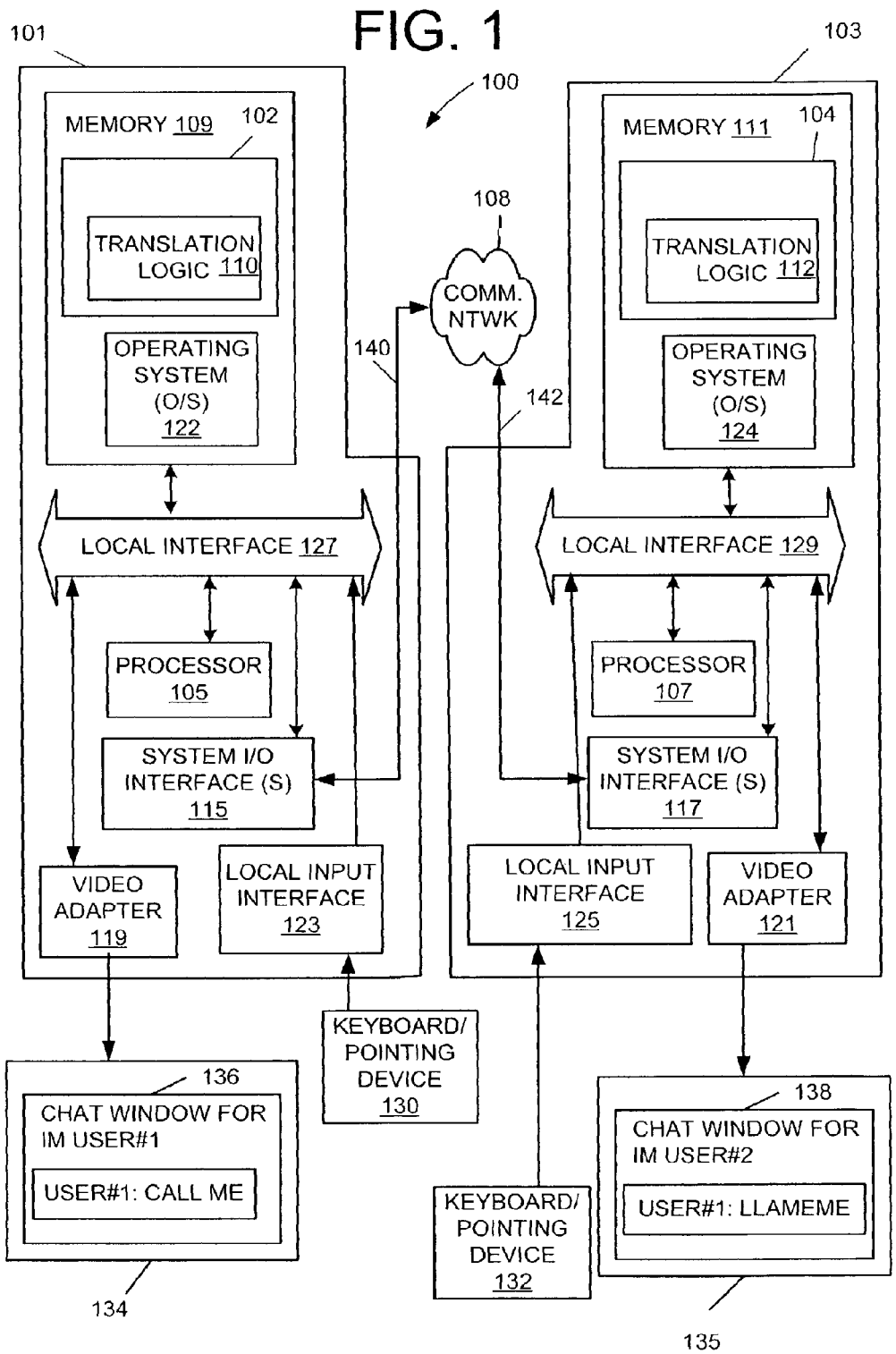
FIG. 1 is a block diagram depicting a preferred embodiment of a system in which text message translations may be implemented.

Referring now in more detail to the drawings, in which like numerals indicate corresponding parts throughout the several views, FIG. 1 is a block diagram depicting a preferred embodiment of a system 100 in which text message translations may be implemented. As shown in the nonlimiting example, a user having an IM configured processing device 101 wishes to have a chat session with another user having an IM configured processing device 103 utilizing a communications network 108. The communications network 108 may be any type of network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. In a preferred embodiment, the communications network 108 is configured as the Internet and includes servers (not shown) for processing services such as Instant Messaging and E-mail, among others.

The processing devices 101, 103 includes client applications 102, 104 (hereinafter referred to as client or clients) that can be implemented in software (e.g., programming stored on a medium, firmware, etc.), hardware, or a combination thereof. In the preferred embodiments, the clients 102, 104 are implemented in software as an executable program, and executed by a special or general purpose digital computer, such as a personal computer (PC; IBM-compatible, Apple-compatible, or otherwise), workstation, minicomputer, or mainframe computer.

Generally, in terms of hardware architecture, each processing device 101, 103 includes, inter alia, a processor 105, 107 and memory 109, 111. Input and/or output (I/O) devices 115, 117 (or peripherals), video adapters 119, 121, local input interfaces 123, 125 can be communicatively coupled to a local interface 127, 129. The local interface 127, 129 can be, for example but not limited to, one or more buses or other wired or wireless connections, as is known in the art. The local interface 127, 129 may have additional elements, which are omitted for simplicity, such as controllers, buffers (caches), drivers, repeaters, and receivers, to enable communications. Further, the local interface 127, 129 may include address, control, and/or data connections to enable appropriate communications among the aforementioned components.

The I/O devices 115, 117 may preferably include input devices, for example but not limited to, a keyboard, mouse, scanner, microphone, etc. In a preferred embodiment, a keyboard and/or pointing device 130, 132 is coupled to the local input interface 123, 125. Furthermore, the I/O devices 115, 117 may also include output devices, for example but not limited to, a printer, display, etc. In a preferred embodiment, a display 134, 135 is coupled to the video adapter 119, 121. In an example, the display 134, 135 is configured to include a chat window 138, 140. Finally, the I/O devices 115, 117 may further include devices that communicate both inputs and outputs to the network 108, for instance but not limited to, a modulator/demodulator (modem; for accessing another device, system, or network), a radio frequency (RF) or other transceiver, a telephonic interface, a bridge, a router, etc.

The processor 105, 107 is preferably a hardware device for executing software, particularly that stored in memory 109, 111. The processor 105, 107 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 109, 111 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 109, 111 may incorporate electronic, magnetic, optical, and/or other types of storage media. Note that the memory 109, 111 can have a distributed architecture, where various components are situated remote from one another, but can be accessed by the processor 109, 111.

The software and/or firmware in memory 109, 111 may include one or more separate programs, each of which comprises an ordered listing of executable instructions for implementing logical functions. In the example of FIG. 1, the software in the memory 109, 111 includes programming for displaying a chat window 136, 138, translation logic 110, 112, and a suitable operating system (O/S) 122, 124. The operating system 122, 124 essentially controls the execution of other computer programs, and provides scheduling, input-output control, file and data management, memory management, and communication control and related services.

The clients 102, 104 are preferably adapted to handle normal IM functions that may include handling conversions of IM functions from various protocols into XML-structured information. The clients 102, 104 include software applications that assists a user in communicating with contacts via an IM session. In this regard, the clients 102, 104 may be stored in a personal computer, a handheld computer, a cellular telephone having IM capabilities, an i-pager, or any network-compatible device.

The clients 102, 104 include programming for displaying a chat window 136, 138 in which a message can be displayed. In an example. User1 wishes to have a chat session with User2. Responsive to input from User1, a message is displayed in User1's chat window 138, for example, "call me." The message is sent via a path 140 over the communications network 108. IM servers (not shown) of the communications network 108 process the chat message and the message is sent via path 142 to User2's primary IM processing device 103.

In a preferred embodiment of the invention, translation logic 110, 112 is configured to translate the English chat message to User#2's preferred language, for instance Spanish. The chat message "call me" is displayed at User#1's chat window 136 in English and at User#2's chat window 138 in Spanish as "llameme," which is the Spanish translation of "call me." The present invention is not limited to translating messages from English to Spanish or Spanish to English, other languages may also be translated.

In a preferred embodiment, the translations occur in the client 102, 104 utilizing the translation logic 110, 112. In an example. User #1 creates a message that is displayed in User #1's the chat window 136 and subsequently is routed to User

2 in English. The message is sent to user #2 in English. Assuming User #2 has translation logic 112, the message is translated by translation logic 112 in User #2's client 104. The translated message is displayed at the display 135 in the preferred language of User #2, for instance Spanish.

In an example, translation logic 110, 112 is preferably configured as a dynamic link library having access to a database that includes a plurality of languages. In a preferred embodiment, one example of an acceptable dynamic link library and database of languages is provided by Babblefish.com a division of IMMS corporation of 10 Kimberly Road, Hampstead, N.H. 03841. Preferably, the dynamic link library is configured to translate received text into a preferred language selected by users when the preferred language is included in the library of languages in the language database.

Figure 2:
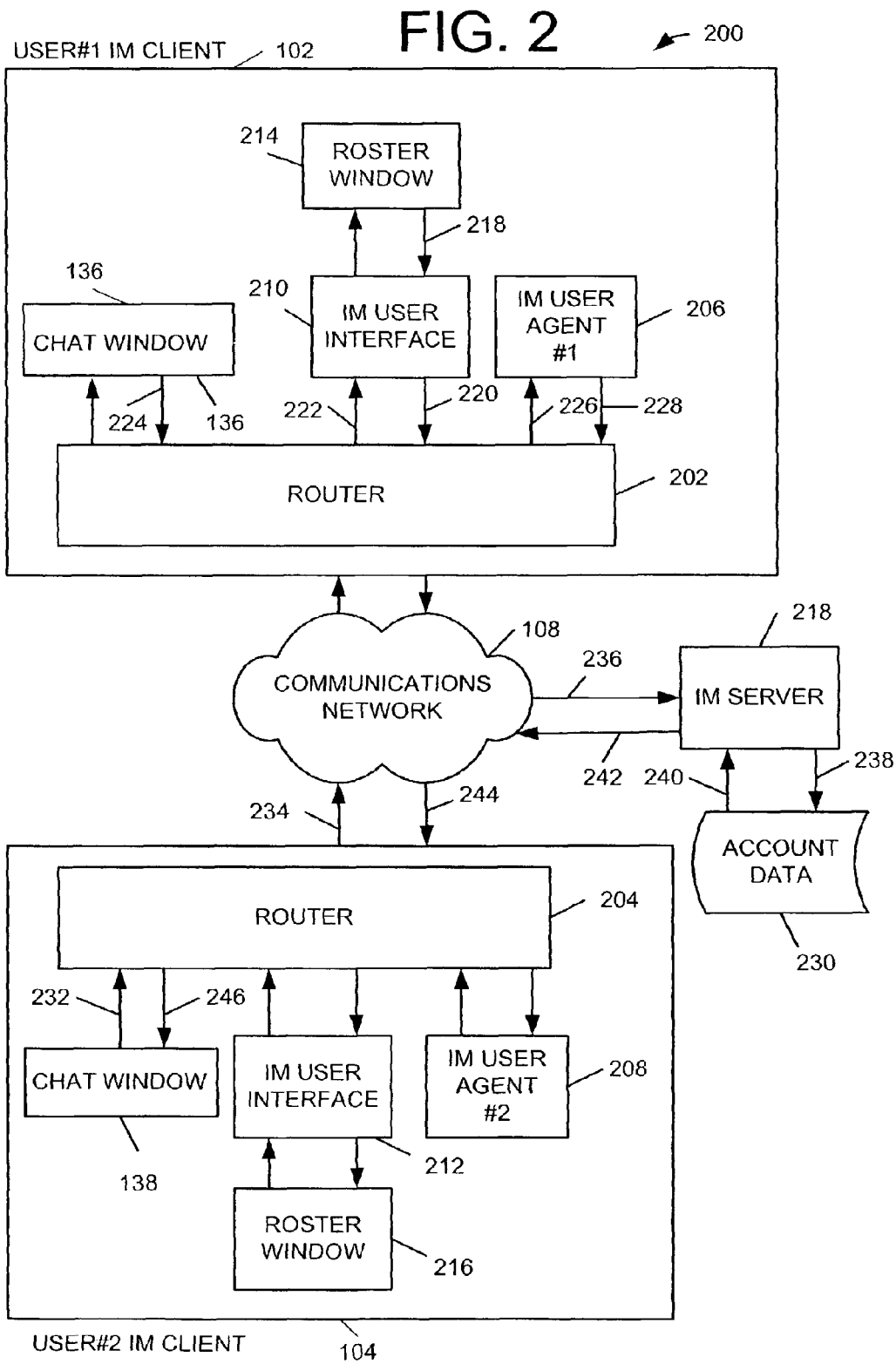
FIG. 2 is a block diagram depicting a preferred embodiment of an illustrative example of a text message translations system.

FIG. 2 is a block diagram depicting a preferred embodiment of an illustrative example of a text message translations system 200. In the example shown in FIG. 2, two users communicate with each other utilizing IM, however the invention is not limited to only two users. In an example, the system 200 includes IM clients 102, 104 that includes translation logic 110, 112 (not shown in FIG. 2), communications network 108, routers 202, 204, IM User Agent #1 206, IM User Agent #2 208, IM user interfaces 210, 212, roster windows 214, 216, chat windows 136, 138, and an IM server 218. In an example embodiment, various components 102, 104, 136, 138, 202, 204, 206, 208, 210, 212, 214, 216, may be seen as software modules, which are launched by users on a personal computer 101, 103 (or other programmable device (not shown)). In another embodiment, various components 102, 104, 136, 138, 202, 204, 206, 208, 210, 212, 214, 216, may be seen as software objects in a distributed network, which are instantiated and destroyed by appropriate software commands. Since instantiation and destruction of objects in distributed network is well known, further discussion of object instantiation and destruction is omitted.

In one embodiment, the various components 102, 104, 136, 138, 202, 204, 206, 208, 210, 212, 214, 216 of FIG. 2 are software modules on a user's personal computer. In this regard, the software modules are installed on a user's personal computer and, thereafter, are launched by users. During installation of the software modules, each user is queried for the user's login names and passwords for all of the user's IM accounts. The login names and passwords for the user's IM accounts are stored in a login database (not shown) for subsequent use by the software modules.

Upon installation of the software modules onto the personal computer, a user launches the router 202 (or 204). The router 202, 204 generates commands to launch the IM user agent 206 (or 208). In a preferred embodiment, the IM user agent 206, 208 performs as a background process. In response to generated commands, the various components 102, 104, 136, 138, 202, 210, 212, 214, 216 are launched as background processes.

The router 202, 204 is configured to track communications and route messages between the IM user agent #1 and #2 206, 208, IM user interface 210, 212 and chat windows 102, 104. In this regard, the router 202, 204 receives commands from the IM user agent #1, #2 206, 208, chat windows 102, 104 and IM user interface 210, 212. Similarly, the router 202, 204 generates commands and directs the generated (or received) commands to the IM user agent #1, #2 206, 208, chat windows 102, 104 and IM user interface 210, 212. Thus, in a general sense, the router 202, 204 receives information (e.g., commands, requests, data, etc.) and directs the received information to the appropriate software module.

In another embodiment, the various components 102, 104, 136, 138, 202, 204, 206, 208, 210, 212, 214, 216 of FIG. 2 are objects in a distributed network (not shown). In this regard, subsequent to installation of the software modules, when a user launches the router 202, 204, the router 202, 204 instantiates the IM user agent #1 206 (or #2 208), IM user interface 210, 212 and chat window 136, 104, and runs these objects on the client system (not shown) as background processes.

Regardless of whether the various components 102, 104, 136, 138, 202, 204, 206, 208, 210, 212, 214, 216 are launched as software modules or instantiated as distributed objects, once the various components 102, 104, 136, 138, 202, 204, 206, 208, 210, 212, 214, 216 are running as background processes, the router 202, 204 launches a IM user interface 210, 212. Upon selection of the IM user interface 210, 212, the router 202, 204 instantiates the IM user interface 210, 212, which queries the user for the user's IM login name and password.

The IM user agent 206, 208 receives the login name and password and looks up the login database (not shown) to determine whether or not the login name and password are valid (i.e., whether or not the login name and password are located in the login database). If the login name and password are valid, then the IM user agent 206, 208 retrieves login names and passwords for all of the user's IM accounts.

Upon retrieving the login names and passwords of all the user's IM accounts from the login database, in some embodiments, the IM user agent 206, 208 logs into each of the user's IM accounts through an IM server 218 using the respective login names and passwords for each of the user's IM accounts. The logging into various IM accounts through an IM server is described in detail in U.S. provisional patent application Ser. Nos. 60/411,336 and 60/419,613, and U.S. patent application Ser. Nos. 10/274,408, 10/274,478 and 10/274,405, which are incorporated herein by reference as if set forth in their entireties. Thus, further discussion of logging into various IM accounts is omitted here.

Upon logging into the various IM accounts, the IM user agent 206, 208 obtains Internet presence information for all of the user's IM contacts as described in U.S. provisional patent application Ser. Nos. 60/411,336 and 60/419,613 and U.S. patent application Ser. Nos. 10/274,408, 10/274,478 and 10/274,405, which are incorporated herein by reference as if set forth in their entireties. Thus, further discussion of obtaining presence information for contacts is omitted here.

Upon logging into the user's various IM accounts and retrieving the Internet presence information of the user's contacts, the IM user agent 206, 208 generates a command to the router 202, 204 to display the retrieved IM information. Upon receiving the command to display the retrieved IM information, the router 202, 204 requests the IM user interface 210, 212 to instantiate a roster window 214, 216 for displaying the user's contacts and the contacts' respective IM Internet presence information. The IM user agent 206, 208 conveys the IM information having the contacts' names and contacts' IM Internet presence information to the router 202, 204. The router 202, 204 further conveys the IM information to the IM user interface 210, 212, which displays the IM contact names and their respective IM Internet presence information to the user at the roster window 214, 216. Thus, at this point, all of the contacts and their respective IM Internet presence information are available to the user at the roster window 214, 216.

An option that is provided to the user at the roster window 214, 216 is the option to chat with a contact. In operation, the user's IM contacts and their respective IM Internet presence information are displayed to the user at the roster window 214, 216. Upon receiving a selection of one of the IM contacts by the user, the roster window 214, 216 generates a request, for example request 218, to the IM user interface 210 to generate a chat window 136, 138. The request 218 includes information related to the selected contact. The IM user interface 210 conveys the request 220 to the router 202, which receives the request 220 and generates a command 222 to the IM user interface 210 to instantiate the chat window 136. The command 222 includes a pointer to the IM user agent 206. The IM user interface 210, in response to the command 222 from the router 202, instantiates the chat window 136. Upon being instantiated, the chat window 136 issues a request 224 to the IM user agent 206 to request 226 the establishment a chat session with the selected contact, for example a user logged into IM accounts at IM user agent #2 208. For example, a request 228 from the IM user agent #1 206 to the router 202 can initiate a chat session. Since the initiation of chat sessions at chat windows is well known in the art, further discussion of initiating chat sessions at chat windows is omitted.

In a preferred embodiment, the system shown in FIG. 2 permits a user to initiate a chat session and engage in a chat session with any of the contacts equipped with translation logic 110, 112 regardless of the contacts' IM account (e.g., BellSouth™ IM account, AOL™ IM account, Yahoo™ IM account, MSN™ IM account, among others). In other embodiments, the chat session occurs between user utilizing IM accounts provided by the same service provider. Greater details related to IM chatting with various contacts at various IM accounts may be found in U.S. provisional patent application Ser. Nos. 60/411,336 and 60/419,613, and U.S. patent application Ser. Nos. 10/274,408, 10/274,478 and 10/274,405, which are incorporated herein by reference in their entireties.

A user can establish his or her language preferences utilizing the system shown in FIG. 2. In an example, user account data 230 is stored in a suitable storage device and accessible by the IM server 218. In a preferred embodiment, a user establishes his or her language preferences during a setup process. In an example, the user setup includes information about the user's IM account including user login name and password, and language preferences, among other information. In an embodiment, the user account data 230 is stored in a memory (not shown) of the IM server 218. The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the IM server 218.

In a preferred embodiment with users having clients equipped with translation logic 110, 112, the IM user interface 210, 212, queries the user for the user's language preferences. The IM user agent 206, 208 receives the user's language preferences and looks up the account data 230 and retrieves language preferences for all of the user's IM accounts. The user is presented with options to modify and save languages preferences in a database having the account data 230. Once established, the user's language preferences are set and utilized upon login by the user. While a user may modify language preferences when desired, or when requested by the IM server 218, it is unnecessary to establish language preferences each time a user instances IM or other services. If a user does not select a language preference, a default language will be utilized to display messages in the chat window 136, 138. In a preferred embodiment, the default language will be English. It is to be understood that IM user agent #2 208 of client 104 equipped with translation logic 112 can complete a similar process to establish language preferences. In a preferred embodiment, the user account data 230 includes language preferences for senders and receivers of text messages such that each user receives and displays the text message in a selected preferred language.

Once the user's language preferences are established, upon login, the IM user agent 206, 208 retrieves the user's language preferences for all of the user's IM accounts. The language displayed for each user in the user's chat window 136, 138 will be the preferred language selected by the user.

In operation, a message is created by the user utilizing the user's preferred language. This message is in a source language that is displayed at the chat window 136. The message in the source language is routed through the router 202 and communications network 108 to another user. In some embodiments, only one client includes translation logic 110 when a client is communication with another client configured to with another IM service. In an embodiment with each client 102, 104 including translation logic 110, 112, the translation logic 110, 112 that determines whether the message in the source language is in the same language as the recipient's preferred language. The recipient's language is also referred to as the destination language. In some embodiments, the language preferences for the destination language have been previously established during the setup process and thus, the client 104 is initialized with the preferred languages. In this embodiment, the client 102, 104 performs the translations and displays the text on the display at 135 in the recipient's preferred language. In an alternative embodiment when language preferences have not been initialized in a client 102, 104, the client 104 having translation logic 112 sends a request 232 to the router 204, the request 234 goes through the communications network 108 as a request 236 to the IM server 218. The IM server 218 requests 238 access the user's account in the account data 230 to obtain the language preferences for the destination language. The language preference information 240 is returned to the IM server 218 and routed 242 to the communications network 108, passed as information 244 to the router 204 and passed as information 246 to the chat window 138.

Armed with the information about the source language and the destination language, the translation logic 112 accesses the language library to get the destination language, and perform the language translation of the message from the source language to the destination language. The message translated from the source language then displayed in the chat window 138 is in the preferred language of the recipient user. A similar process is performed when the user at chat window 138 sends a message to the user at chat window 136, assuming the user at chat window 136 has the translation functionality of the present invention's preferred embodiments. However, the language of the user at chat window 136 becomes the source language and the language of the user at chat window 136 becomes the destination language.

In the environment of a group chat, one message can be sent and received in a source language yet translated and displayed in the preferred language of each recipient user. The client for each recipient will perform the functions described above such that the message is displayed in the preferred language for each recipient, assuming the recipient user has the translation functionality of the present invention's preferred embodiments.

Figure 3:
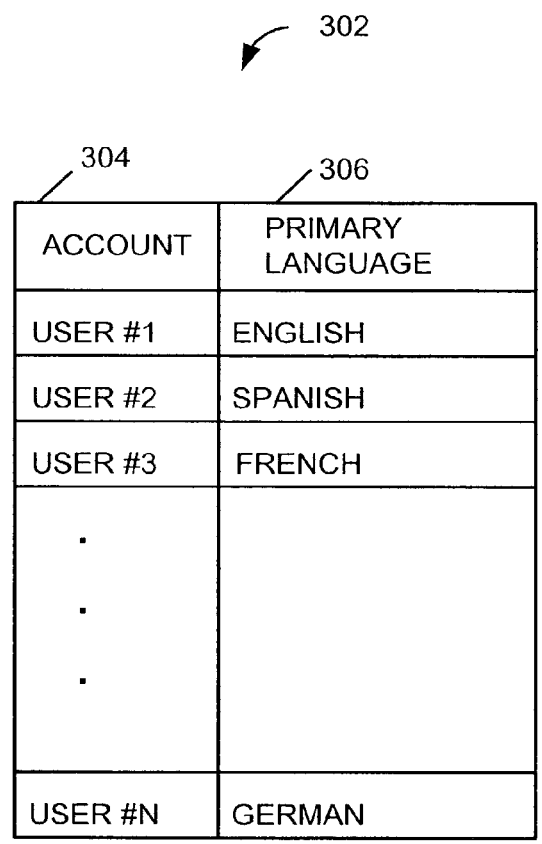
FIG. 3 is a diagram depicting an illustrative example of a language preferences table of a text message translations system.

FIG. 3 is a diagram depicting an illustrative example of a language preferences table 302 of a text message translations system. In an embodiment, the table 302 is stored in memory of a database having the user account data 230. The table 302 includes account information 304 and associated primary language information 306 for each user. In the example shown in FIG. 4, User#1 has selected English as a primary language, User#2 has selected Spanish as a primary language. User #3 has selected French as a primary language, etc. In an alternative embodiment, a user may have multiple accounts. The user can select a different language for each account. For instance, if User#1 has three accounts, User#1 can select English as the primary language for account 1, Spanish as the primary language for account 2, and French as the primary language for account 3.

In an illustrative example, languages supported by the invention include, English, Spanish, French, and German, among others. However, the invention is not limited to these languages. In an example, each language requires about 10 Mb of memory on the client 102, 104.

Figure 4:
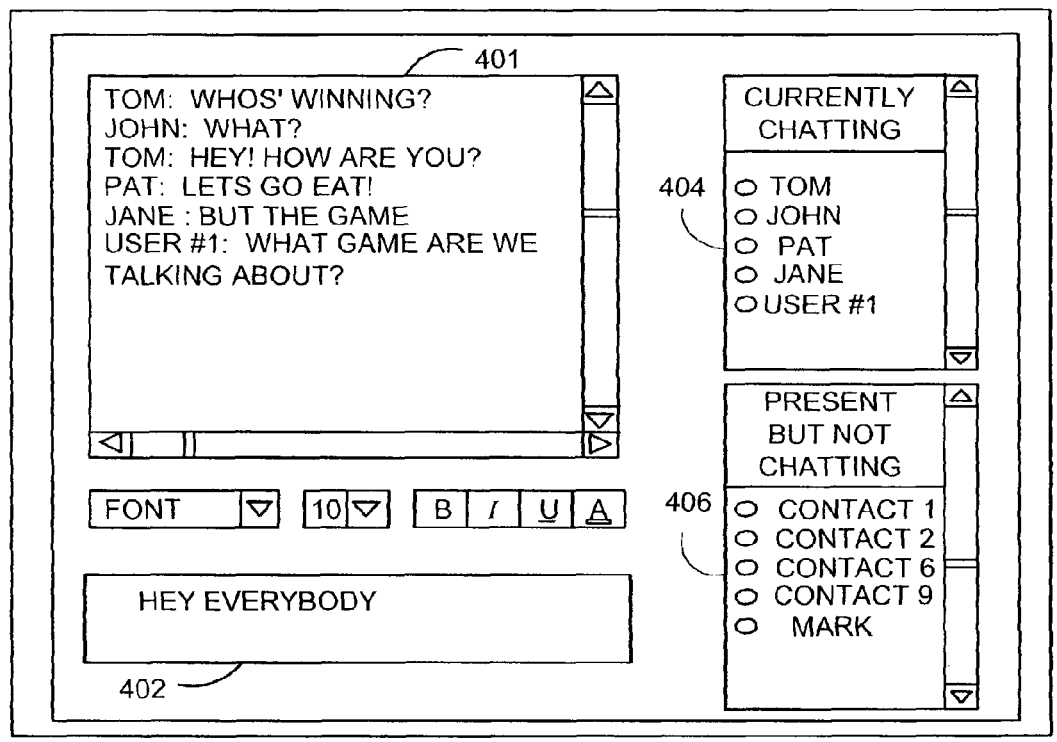
FIG. 4 is a diagram showing an illustrative example of a chat window in English for IM user #1 of FIG. 1.
Figure 5:
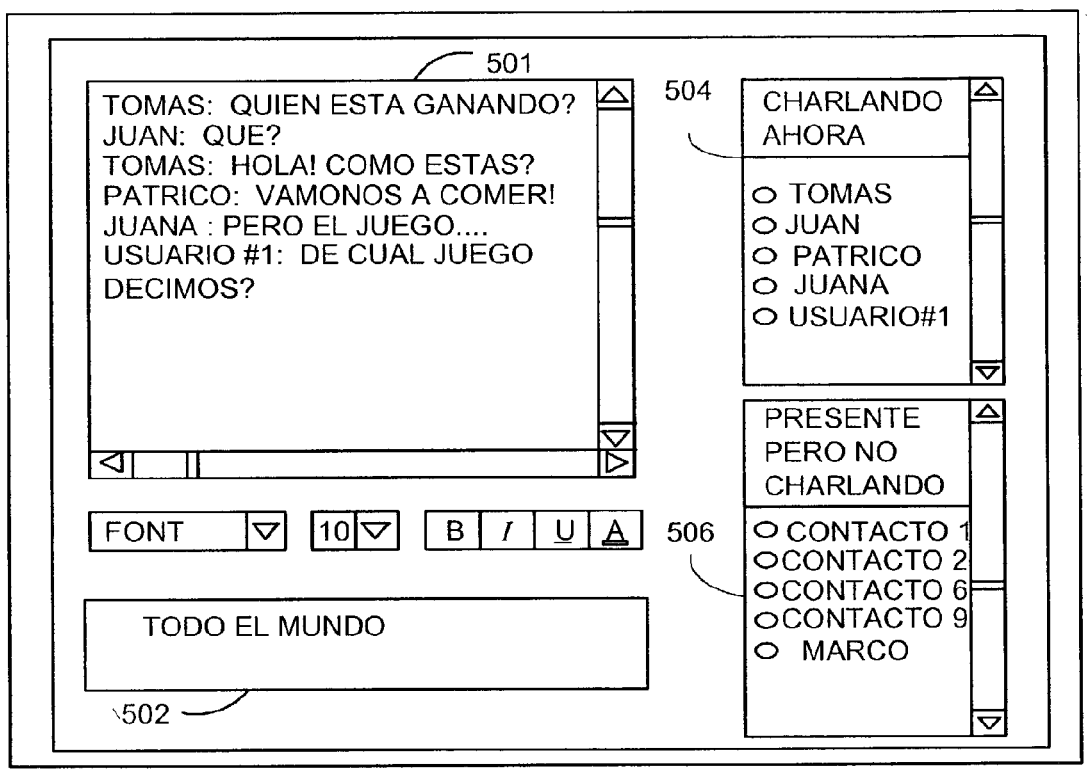
FIG. 5 is a diagram showing an illustrative example of a chat window in Spanish for IM user #2 of FIG. 1.
Figure 6:
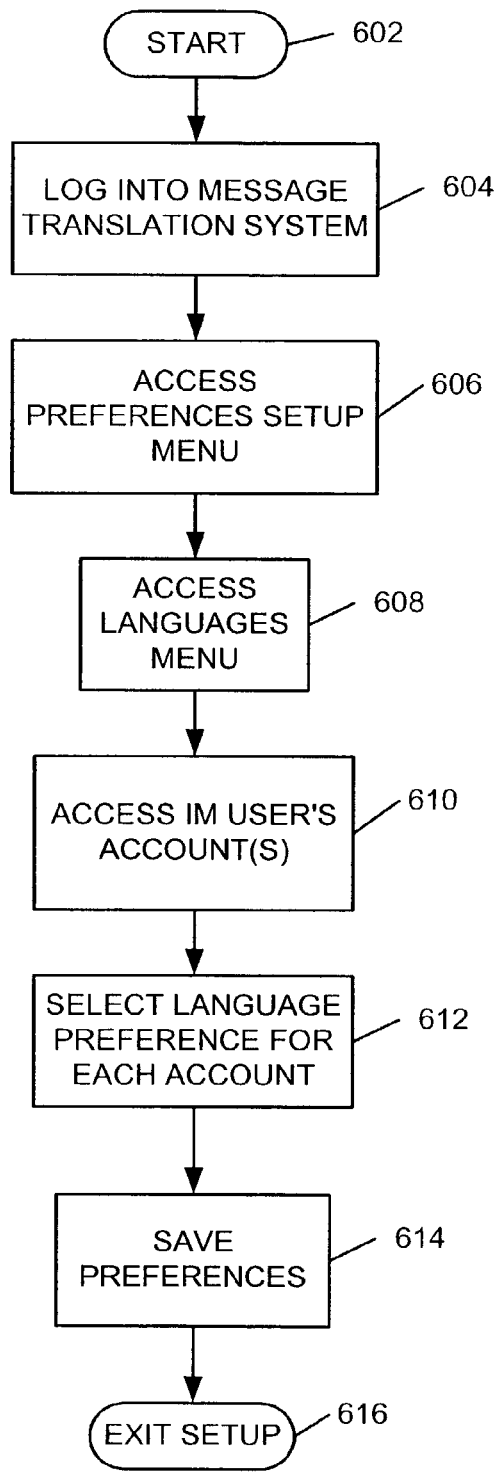
FIG. 6 is a flow chart depicting general functionality of a preferred embodiment for implementing a language preference setup in a text message translation system.

FIG. 4 is a diagram showing an illustrative example of chat window 136 in English for IM User #1 of FIG. 1. An illustrative example of chat window 138 for User#2 is shown in FIG. 5. As shown in FIG. 6, the chat window 136 includes a transcript display window 401, a user input window 402, a first roster window 404, and a second roster window 406. The transcript display window 401 displays IM messages that are typed by all of the participants in the IM chat session. Thus, if Tom, John, Pat, Jane and User #1 are engaged in an IM chat session, then each of the messages typed by the participants is displayed in the transcript display window 401. The user input window 402 displays the IM messages that are being typed by User #1. In this embodiment, the messages are displayed in English since IM User #1 has selected English as the preferred language.

The first roster window 404 shows all of the contacts that are currently chatting in the chat window 136, while the second roster window 406 displays all of the contacts that are present on the Internet. If User #1 chooses to invite a contact from the second roster window 406 to the current chat session in the chat window 136, then User #1 may select the contact from the second roster window 406 and "drag and drop" that contact into the first roster window 404, thereby effectively inviting that contact into the current chat session. Similarly, if User #1 wishes to remove a currently chatting contact from the IM chat session, then User #1 may "drag and drop" that contact from the first roster window 404 to the second roster window 406. Thus, as shown with reference to FIG. 4, each of the participants of the IM session may invite or remove participants from the current IM chat session by moving the contacts from one roster window to the other roster window.

Although chatting between multiple participants from a common IM service is known in the art, the embodiment of FIG. 4 permits chatting between multiple participants from different IM services with text displayed in the preferred language of the recipient. Translations can occur at chat windows of users of different IM services that include translation logic 110, 112, and in such cases, Tom may be using Yahoo IM service, while John is using AOL IM service, while Pat and Tane may each be using MSN IM service as long as these IM services have been modified to include translation logic 110, 112.

In operation, when the User #1 types an IM message at the user input window 402, the typed message is converted into the native protocol associated with each of the other participants' IM service, in addition, as described in FIGS. 1 and 2, the message is translated to the recipient's preferred language before the message is displayed at the recipient's IM chat window, but after being received at the recipient's location. Thus, any message typed by User #1 is displayed to each of the other participants in the IM chat session in their preferred language. Similarly, when the other participants type messages from their native IM windows, these messages are converted from the native protocols to the particular IM services' protocol, translated to the preferred language of the recipient, and the translated messages are displayed to User #1 in English at the IM chat window 401. Conversions to and from native protocols is described in detail in U.S. provisional patent application Ser. Nos. 60/411,336 and 60/419,613 and U.S. patent application Ser. Nos. 10/274,408, 10/274,478, and 10/274,405 which are incorporated by reference herein. Thus, further discussion of conversions into native protocols is omitted here and again is not necessary is some embodiments.

FIG. 5 is a diagram showing an illustrative example of chat window 138 in Spanish for IM User #2 of FIG. 1. As shown in FIG. 5, the chat window 138 includes a transcript display window 501, a user input window 502, a first roster window 504, and a second roster window 506. The transcript display window 501 displays IM messages that are typed by all of the participants in the IM chat session. Thus, if users Tomas, Juan, Patrico, Juana and Usuario #1 are engaged in an IM chat session, then each of the messages typed by the participants is displayed in the transcript display window 501. The user input window 502 displays the IM messages that are being typed by User #2. In this embodiment, the messages are displayed in Spanish since IM User #2 has selected Spanish as the preferred language.

The first roster window 504 shows all of the contacts that are currently chatting in the chat window 138, while the second roster window 506 displays all of the contacts that are present on the Internet. Similarly to the features and functions described with respect to FIG. 4 above, User #2 may invite or remove participants from the current IM chat session by moving the contacts from one roster window to the other roster window.

FIG. 6 is a flow chart depicting general functionality of a preferred embodiment for implementing a language preference setup in a text message translation system. The process begins at 602. At 604, a user logs into the message translation system. At 606, the user accesses a preferences option in a setup menu. In a preferred embodiment, a user interface is utilized to display the setup menu. At 608, the user accesses a languages section of the setup menu. The languages section includes a plurality of languages supported by the message translation system. The user access their IM account(s) at 610. In an embodiment, the user will be requested to provide identifying information to access the IM account. For example, the user may be requested to provide a password or other security information to access the IM account. At 612, the user selects a language preference for each IM account. If a user has multiple accounts, the user may select different languages for each account or select the same language for each account. If the user does not select a language for each account, the message translation system will utilize English as the default language for the accounts. At 614, the user saves the selected language preferences. At 616, the user exits the setup process.

Figure 7:
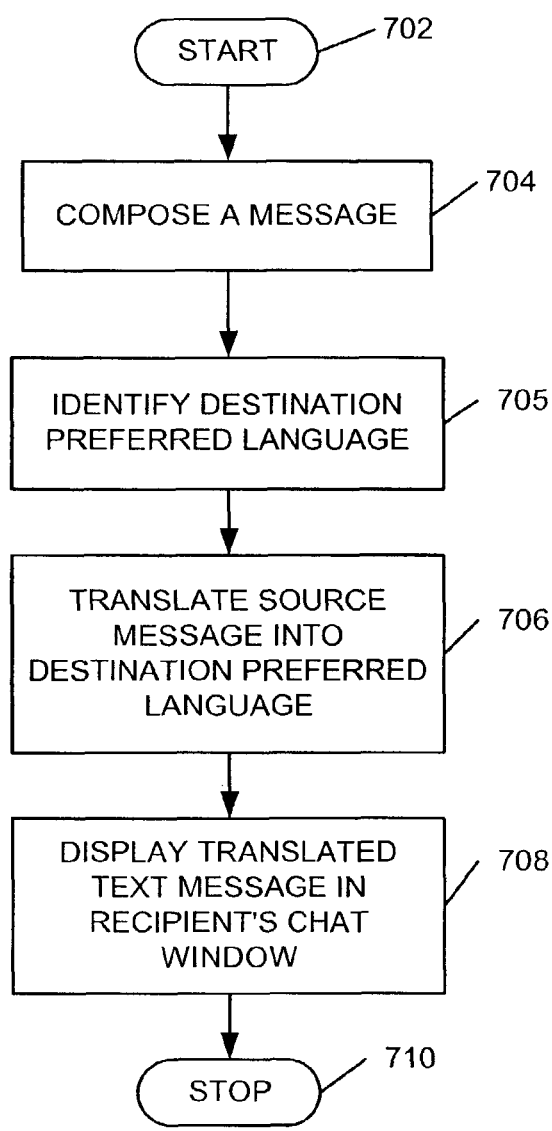
FIG. 7 is a flow chart depicting general functionality of a preferred embodiment for implementing a text message translation system.

FIG. 7 is a flow chart depicting general functionality of a preferred embodiment for implementing a text message translation system. The process begins at 702. At 704, a user composes a message to be sent to another user, or users, during a chat session. The preferred language of the recipient(s) is identified at 705. In an example, the recipient's client including translation logic accesses information on the recipient's language preferences. At 706, the source message is translated into a preferred language of the destination user(s). At 708, the translated message is displayed in chat windows of the recipients. The process ends at 710.

FIG. 8 is a flow chart depicting more specific functionality of a preferred embodiment for implementing a text message translation. The process begins at 802. At 804, a message is received at a chat window. The message is received in a language of the sender or broadcaster of the message. The language of the sender (e.g., the source language) may or may not be in the preferred language of the recipient (e.g., the destination language). Preferably, clients have been initialized during a setup process with information regarding the preferred destination language. At 806, a determination is made as to whether the source language is the same as the preferred destination language. If the source language is the same as the preferred destination language, at 807, the message is displayed at a display device. If the source language is not the same as the preferred destination language, in a preferred embodiment, at 812, the client translates the message from the source language to the destination language. In a preferred embodiment, the client performs a call to a translation engine, such as a dynamic link library having access to a languages database, and requests the message string to be translated from the source language to the preferred destination language. In some embodiments, a request from a client is sent to an IM server to obtain account data about the recipient user. In an example, the account data includes language preferences for each IM account for users. The request from the client is sent to a router that routes the request through a communications network to an IM server. In an alternative embodiment, the client directly interfaces with the IM server. The IM server contains or has access to the account data including language preferences established by users during a setup process. If the user has not selected a preferred language, English may be utilized as the default language. Upon receipt of the destination language information, the destination language information is routed from the IM server to a communications network to a router and received by the client. The client translates the source language into the preferred destination language. At 807, the translated language in a preferred destination language is displayed at a display device. At 816, a determination is made as to whether another message has been received. If yes, the process continues at 806. If no, the process ends at 818.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The preferred embodiment of the present invention provides systems and methods for a real-time, in-line, bi-directional translation of both Instant Message and E-mail messages. The present invention provides for translating messages into a preferred language of the recipient of the message before displaying the message. Thus, the recipient can view the message in a preferred language and does not need to manually translate the received message.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method comprising:
receiving a preferred language identification for each of a plurality of message accounts associated with a first user;
associating each preferred language identification with a respective one of the plurality of message accounts, each of the plurality of message accounts having a different preferred language identification;
determining that a source language of an electronic message sent via a particular one of the plurality of message accounts from the first user to a second user is different from a first preferred language associated with the particular message account; and
translating the electronic message to the first preferred language.

2. The method of claim 1, further comprising:
outputting the electronic message in the first preferred language for display in a transcript window associated with the second user.

3. The method of claim 2, further comprising:
receiving a reply message, in a first language, from the second user to the first user via a specific one of the plurality of message accounts;
determining a second preferred language associated with the specific message account; and
translating the reply message to the second preferred language when the first language is not the same as the second preferred language.

4. The method of claim 3, further comprising:
outputting the reply message in the second preferred language for display in a transcript window associated with the first user.

5. The method of claim 3, further comprising:
broadcasting the reply message in the second preferred language to a plurality of users in a chat session.

6. The method of claim 1, further comprising:
broadcasting the electronic message in the first preferred language to a plurality of users in a chat session.

7. The method of claim 1, wherein the translating the electronic message is performed using a dynamic link library and an associated language database.

8. An apparatus comprising:
a processor; and a memory to store computer program instructions, the computer program instructions when executed on the processor cause the processor to perform operations comprising:
  receiving a preferred language identification for each of a plurality of message accounts associated with a first user;
  associating each preferred language identification with a respective one of the plurality of message accounts, each of the plurality of message accounts having a different preferred language identification;
  determining that a source language of an electronic message sent via a particular one of the plurality of message accounts from the first user to a second user is different from a first preferred language associated with the particular message account; and
  translating the electronic message to the first preferred language.

9. The apparatus of claim 8, the operations further comprising:
  outputting the electronic message in the first preferred language for display in a transcript window associated with the second user.

10. The apparatus of claim 9, the operations further comprising:
  receiving a reply message, in a first language, from the second user to the first user via a specific one of the plurality of message accounts;
  determining a second preferred language associated with the specific message account; and
  translating the reply message to the second preferred language when the first language is not the same as the second preferred language.

11. The apparatus of claim 10, the operations further comprising:
  outputting the reply message in the second preferred language for display in a transcript window associated with the first user.

12. The apparatus of claim 10, the operations further comprising:
  broadcasting the reply message in the second preferred language to a plurality of users in a chat session.

13. The apparatus of claim 8, the operations further comprising:
  broadcasting the electronic message in the first preferred language to a plurality of users in a chat session.

14. The apparatus of claim 8, wherein the translating the electronic message is performed using a dynamic link library and an associated language database.

15. A non-transitory computer readable medium storing computer program instructions, which, when executed on a processor, cause the processor to perform operations comprising:
  receiving a preferred language identification for each of a plurality of message accounts associated with a first user;
  associating each preferred language identification with a respective one of the plurality of message accounts, each of the plurality of message accounts having a different preferred language identification;
  determining that a source language of an electronic message sent via a particular one of the plurality of message accounts from the first user to a second user is different from a first preferred language associated with the particular message account; and
  translating the electronic message to the first preferred language.

16. The non-transitory computer readable medium of claim 15, the operations further comprising:
  outputting the electronic message in the first preferred language for display in a transcript window associated with the second user.

17. The non-transitory computer readable medium of claim 16, the operations further comprising:
  receiving a reply message, in a first language, from the second user to the first user via a specific one of the plurality of message accounts;
  determining a second preferred language associated with the specific message account; and
  translating the reply message to the second preferred language when the first language is not the same as the second preferred language.

18. The non-transitory computer readable medium of claim 17, the operations further comprising:
  outputting the reply message in the second preferred language for display in a transcript window associated with the first user.

19. The non-transitory computer readable medium of claim 17, the operations further comprising:
  broadcasting the reply message in the second preferred language to a plurality of users in a chat session.

20. The non-transitory computer readable medium of claim 15, the operations further comprising:
  broadcasting the electronic message in the first preferred language to a plurality of users in a chat session.

* * * * *